United States Patent
Lehman (10) Patent No.: US 9,233,488 B2
(45) Date of Patent: Jan. 12, 2016

(54) DIE ASSEMBLY AND METHOD OF EXTRUDING CELLULAR CERAMIC SUBSTRATES WITH A SKIN

(71) Applicant: Corning Incorporated, Corning, NY (US)

(72) Inventor: Michael James Lehman, Canisteo, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 13/929,055

(22) Filed: Jun. 27, 2013

(65) Prior Publication Data

US 2013/0285281 A1 Oct. 31, 2013

Related U.S. Application Data

(62) Division of application No. 12/786,983, filed on May 25, 2010, now Pat. No. 8,491,295.

(60) Provisional application No. 61/181,817, filed on May 28, 2009.

(51) Int. Cl.

| | | |
|---|---|---|
| *B29C 33/42* | (2006.01) | |
| *B29C 47/00* | (2006.01) | |
| *B29C 47/12* | (2006.01) | |
| *B23P 15/24* | (2006.01) | |
| *B28B 3/26* | (2006.01) | |
| *B29D 99/00* | (2010.01) | |
| *B29L 31/60* | (2006.01) | |

(52) U.S. Cl.
CPC ............. *B29C 33/42* (2013.01); *B23P 15/243* (2013.01); *B28B 3/269* (2013.01); *B29C 47/0028* (2013.01); *B29C 47/12* (2013.01); *B29D 99/0089* (2013.01); *B29L 2031/60* (2013.01)

(58) Field of Classification Search
CPC ... B23P 15/243; B28B 3/269; B29C 47/0028; B29C 47/005; B29C 47/0061; B29C 47/0816; B29C 47/12; B29C 47/128; B29C 47/30; B29C 2947/92152; B29C 2947/92171; B29C 2947/92647; B29C 2947/92666; B29D 99/0089; B29L 2031/14; B29L 2031/608; B29L 2031/757
USPC ................ 29/896.6, 896.62, 407.05, 407.09, 29/557–558, 902; 264/219, 177.12; 425/198, 175, 516, 300
See application file for complete search history.

(56) References Cited

U.S. PATENT DOCUMENTS

| | | |
|---|---|---|
| 4,900,698 A | 2/1990 | Lundsager |
| 5,188,779 A | 2/1993 | Horikawa et al. |
| 5,429,779 A | 7/1995 | Locker et al. |

(Continued)

*Primary Examiner* — David Bryant
*Assistant Examiner* — Matthew P Travers
(74) *Attorney, Agent, or Firm* — Charles A. Greene (57) ABSTRACT

An extrusion apparatus including a die and a mask are provided such that no slots feed directly into the longitudinal skin forming gap between the mask and the die. In a method of forming a die adapted to improve skin uniformity of extruded cellular ceramic substrates a slotted block of die material is provided including central slots adapted to form a cellular matrix of the substrate and peripheral slots located outwardly of the central slots designed to be covered by a skin former mask and adapted to extrude peripheral batch material. An arcuate skin former is cut corresponding to a target shrinkage so as to intersect the slotted block such that skin flow from tangent slots at 90 degree positions of the die is limited to the peripheral batch material.

18 Claims, 7 Drawing Sheets

(56) References Cited

U.S. PATENT DOCUMENTS

| | | |
|---|---|---|
| 5,518,969 A | 5/1996 | Ragan |
| 6,280,353 B1 | 8/2001 | Brundage |
| 6,695,967 B2 | 2/2004 | Bishop et al. |
| 6,733,703 B2 | 5/2004 | Billiet et al. |
| 6,846,768 B1 | 1/2005 | Parker |
| 7,306,642 B2 | 12/2007 | Hayward et al. |
| 7,341,970 B2 | 3/2008 | Beall et al. |
| 2004/0097362 A1 | 5/2004 | Addiego |
| 2007/0026188 A1* | 2/2007 | Bookbinder et al. ........... 428/73 |
| 2008/0085393 A1 | 4/2008 | Wusirika |
| 2009/0028982 A1* | 1/2009 | Asaoka .................. 425/464 |

* cited by examiner

DIE ASSEMBLY AND METHOD OF EXTRUDING CELLULAR CERAMIC SUBSTRATES WITH A SKIN

CROSS REFERENCE TO RELATED APPLICATIONS

This application is a divisional of U.S. patent application Ser. No. 12/786,983, filed on May 25, 2010, which claims priority from and the benefit of U.S. Provisional Application No. 61/181,817, filed on May 28, 2009, both of which are hereby incorporated by reference for all purposes as if fully set forth herein.

FIELD

The present disclosure is directed to dies adapted to extrude cellular substrates from plasticized ceramic-forming batch materials and, in particular, honeycomb substrate with extruded skin.

BACKGROUND

Skinned honeycomb extrusion is accomplished by extruding plasticized ceramic-forming batch materials, such as cordierite ceramic forming batch materials, through honeycomb extrusion dies to form structures having a central webbed cellular honeycomb structure surrounded by a thin integral outer skin layer. Such skins provide additional strength to such honeycomb articles. Typically, the honeycomb extrusion dies employed to produce such skinned honeycomb articles are multi-component assemblies including, for example, a web-forming die body combined with a skin-forming mask. U.S. Pat. Nos. 4,349,329 and 4,298,328 exemplify die structures including skin-forming masks. The die body typically includes batch feed holes leading to and intersecting with an array of thin discharge slots formed in the die face, through which the batch material is extruded. This extrusion forms an interconnecting array of crisscrossing thin webs forming the central cellular honeycomb structure. The mask is generally a ring-like circumferential structure, typically in the form of a collar, defining the periphery of the skin of the honeycomb. The circumferential skin layer of the honeycomb article is formed by extruding the batch material between the mask and the die body.

SUMMARY

In one aspect, an extrusion apparatus is disclosed herein comprising: an extrusion die having an upstream side and a downstream side disposed longitudinally opposite from the upstream side, the die comprising a plurality of spaced apart pins defining an interconnected matrix of longitudinal slots opening to the downstream side, the pins having respective generally co-planar tops forming, at the upstream side, a discharge surface and a recessed skin former surface disposed radially outwardly of the discharge surface, the pins being comprised of boundary pins having tops terminating at the discharge surface and being disposed at the outer periphery of the discharge surface, and interior pins being disposed radially inward of the boundary pins; and an annular mask comprising an upstream transverse wall and an inward facing longitudinal wall; wherein the upstream transverse wall of the annular mask is spaced away from the recessed skin former surface in a longitudinal direction, thereby longitudinally masking the longitudinal slots terminating in the recessed skin former surface, to provide a skin former reservoir between the mask and the die; wherein the inward facing longitudinal wall of the mask is radially spaced away from the tops of the pins to form a face gap F that provides a terminal opening for the skin former reservoir proximate the tops of the pins; and wherein the mask longitudinally masks the slots terminating at the skin former surface at a location immediately adjacent the die where at least one of the longitudinal slots formed by one or more boundary pins and the corresponding one or more immediately adjacent interior pins is disposed substantially perpendicularly to the inward facing longitudinal wall.

In another aspect, a method is disclosed herein for forming a die adapted to improve skin uniformity and thus strength of extruded ceramic substrates. Extrusion dies are designed to match the batch shrinkage of the ceramic composition from which the substrate will be formed. Small changes in shrinkage can be managed in the manufacturing process to obtain exact contour for specific customers. Utilizing the adjustability of the shrinkage it is possible to design dies to particular target shrinkage ranges that permit greater control of skin uniformity of the substrate than might be the case at other particular ranges of shrinkage. This greater control is gained by choosing target shrinkages and corresponding die assembly parameters that maintain pin integrity and control slot location at 90 degree positions of the die.

In some embodiments, a method of forming a die adapted to improve skin uniformity of extruded cellular ceramic substrates, comprising providing a slotted block of die material including central slots adapted to form a cellular matrix of the substrate and peripheral slots located outwardly of the central slots designed to be covered by a skin former mask and adapted to extrude peripheral batch material. A target shrinkage is selected. An arcuate skin former is cut corresponding to the target shrinkage so as to intersect the slotted block such that skin flow from tangent slots at 90 degree positions of the die is limited to the peripheral batch material. (i.e., fed only from tangential "outer slots" at the 90's as defined below). By limiting skin flow at the 90's to peripheral batch material fed from the outer slots, no tangent slot feeds directly into the face gap at the 90's, which leads to enhanced skin uniformity.

In some embodiments, values for slot width (W), slot spacing (S) and face gap (F) are determined, and ranges of values for inner slot to pin face (I) and outer slot to mask (O) are obtained, according to the following Equations I:

$$O\min = \text{a minimum outer slot to mask distance} = \tfrac{1}{2}W;$$

$$I\max = \text{a maximum inner slot to pin face distance} = S - F - O\min;$$

$$I\min = \text{a minimum inner slot to pin face distance} = \tfrac{1}{2}W;\text{ and}$$

$$O\max = \text{a maximum outer slot to mask distance} = S - F - I\min,$$

wherein the skin former is cut at O and I values within the ranges.

In other embodiments, first values for O and I can be calculated using a first shrinkage, outer dimension of fired substrate, mask radius and pin face radius; and it can be determined whether the first values for O and I fall within the ranges for O and I (according to Equations I). If the first values for O and I fall within the ranges for O and I, then the skin former is cut at the first values of O and I corresponding to the first target shrinkage. If the first values for O and I do not fall within the ranges for O and I, then second values for O and I in the range are selected, and the skin former is cut at the second values for O and I corresponding to the second target shrinkage.

A difference in skin thickness corresponding to the 90 degree positions of the die and the 45 degree positions of the die is not more than 3.00 mils (one mil being $1 \times 10^{-3}$ inch). This can also result in fired substrates having an average skin thickness of not more than 15 mils.

Many additional features, advantages and a fuller understanding of the invention will be had from the accompanying drawings and the detailed description that follows. It should be understood that the above Summary of the Invention describes the invention in broad terms while the following Detailed Description describes the invention more narrowly and presents embodiments that should not be construed as necessary limitations of the broad invention as defined in the claims.

DETAILED DESCRIPTION

Thermal durability of cellular ceramic substrates has been correlated to "skin thinness" and uniformity. Substrates with thicker skin and less uniform skin thickness fail at lower temperatures in thermal shock testing. Thinner skin (e.g., three or four times the web thickness) creates a more thermally resistant design. There are many hardware configurations and die designs utilized in the extrusion process to facilitate forming "thin" skin, including reduced skin former depth, multiple step skin former cut (step burn), face gap and shim design. U.S. Pat. Nos. 4,668,176 and 4,710,123, for example, describe die designs wherein skin thickness can be controlled by adjusting the width of the gap between the die body and mask. Also shown are means for adjusting the supply of batch material to the skin-forming region of the die. Skin forming adjustments are currently made, for example, using masks, shims and flow-plates placed in front of or behind the die as it is used to extrude ceramic substrates. These tools control bulk flow and velocity of the material and are primarily concerned with controlling the outer diameter of the skin.

In one aspect, an extrusion apparatus is disclosed herein comprising: an extrusion die having an upstream side and a downstream side disposed longitudinally opposite from the upstream side, the die comprising a plurality of spaced apart pins defining an interconnected matrix of longitudinal slots opening to the downstream side, the pins having respective generally co-planar tops forming, at the upstream side, a discharge surface and a recessed skin former surface disposed radially outwardly of the discharge surface, the pins being comprised of boundary pins having tops terminating at the discharge surface and being disposed at the outer periphery of the discharge surface, and interior pins being disposed radially inward of the boundary pins; an annular mask comprising an upstream transverse wall and an inward facing longitudinal wall, wherein the upstream transverse wall of the annular mask is spaced away from the recessed skin former surface in a longitudinal direction, thereby longitudinally masking the longitudinal slots terminating in the recessed skin former surface, to provide a skin former reservoir between the mask and the die, wherein the inward facing longitudinal wall of the mask is radially spaced away from the tops of the pins to form a face gap F that provides a terminal opening for the skin former reservoir proximate the tops of the pins, and wherein the mask longitudinally masks the slots terminating at the skin former surface at a location immediately adjacent the die where at least one of the longitudinal slots formed by one or more boundary pins and the corresponding one or more immediately adjacent interior pins is disposed substantially perpendicularly to the inward facing longitudinal wall.

In some embodiments, at least one of the boundary pins comprises a top surface and a recessed surface, the top surface being generally co-planar with the discharge surface.

In some embodiments, the recessed surface is a ramp portion of the die.

In some embodiments, all slots in the recessed skin former surface at the 90's and immediately adjacent to a corresponding boundary pin is located at a distance equivalent to one half the thickness of the boundary pin, or more, away from the plane of the inward facing longitudinal wall of the mask.

In some embodiments, a majority of the interconnected matrix of longitudinal slots are X slots and Y slots, wherein the X and Y slots are disposed perpendicularly to each other.

In some embodiments, a majority of the slots intersect at right angles.

In some embodiments, the mask longitudinally masks the slots terminating at the skin former surface at a location immediately adjacent the die at the 90's of the slot pattern.

In another aspect, a method of forming a die adapted to improve skin uniformity of extruded cellular ceramic substrates is disclosed herein, comprising: providing a slotted block of die material including central slots adapted to form a cellular matrix of the substrate and peripheral slots located outwardly of the central slots designed to be covered by a skin former mask and adapted to extrude peripheral batch material; selecting a target shrinkage; and cutting an arcuate skin former corresponding to said target shrinkage so as to intersect said slotted block such that skin flow from tangent slots at 90 degree positions of the die is limited to said peripheral batch material. In some embodiments, said cutting of said skin former produces a circular or oval ramp intersecting a discharge face at a front of the die, and a peripheral die surface located outwardly of said ramp; in some of these embodiments, said skin former ramp forms a partial pin having a sloped pin face at the 90 degree positions of the die. In some embodiments, said plurality of slots are configured to form square cells in the cellular substrate. In some embodiments, the method further comprises determining values for slot width (W), slot spacing (S) and face gap (F), and obtaining ranges of O and I as follows:

$O\min$ = a minimum outer slot to mask distance = $\frac{1}{2}W$;

$I\max$ = a maximum inner slot to pin face distance = $S - F - O\min$;

$I\min$ = a minimum inner slot to pin face distance = $\frac{1}{2}W$; and $O\max$ = a maximum outer slot to mask distance = $S - F - I\min$, wherein said skin former is cut at values of O and I in said ranges.

The method can further comprise: calculating first values for O and I, using a first shrinkage, outer dimension of fired substrate, mask radius and pin face radius; and determining whether said first values for O and I satisfy said ranges for O and I; in some embodiments, if said first values for O and I fall within said ranges for O and I then cutting said skin former at said first values of O and I corresponding to said first target shrinkage. In some embodiments, if said first values for O and I do not fall within said ranges for O and I then selecting second values for O and I in said range, and cutting said skin former at said second values for O and I corresponding to said second target shrinkage.

In some embodiments, a difference between a skin thickness corresponding to the 90 degree positions of the die and a skin thickness corresponding to 45 degree positions of the die is not more than 3.00 mils.

In some embodiments, average thickness of skin produced from said die is approximately 15 mils or less after firing.

The method can be applied to new product designs incorporating alternate cell geometries, dies, and compositions to optimize the product design.

Figure 4:
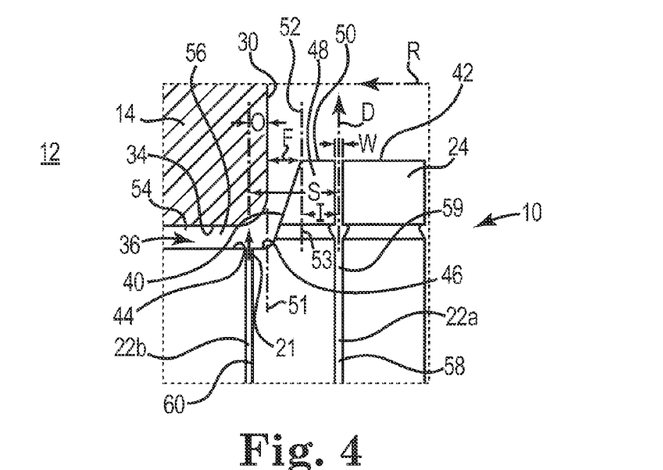
FIG. 4 is a cross-sectional view of a portion of a die and skin former mask taken at a 90 degree position of the die (designed for 4.0% shrinkage) as seen from the plane labeled 4-4 in FIG. 3.
Figure 6:
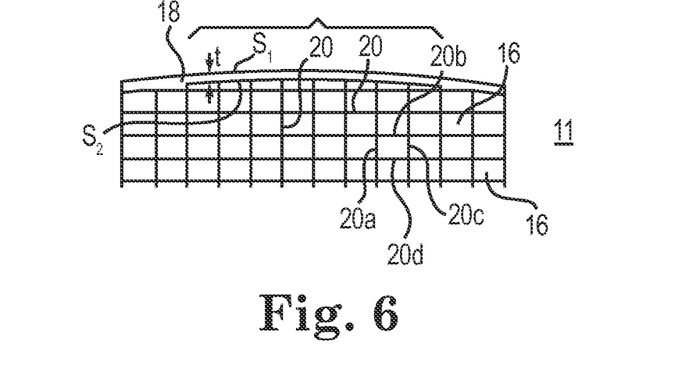
FIG. 6 is a photograph of a 90 degree portion of a fired ceramic substrate produced by the die shown in FIGS. 3-5.

In some embodiments, a method is disclosed herein for forming a die 10 adapted to improve skin uniformity of extruded ceramic honeycomb substrates (a portion of a substrate 11 being shown in FIG. 6). The die forms a part of a die assembly 12 that includes die 10 and a skin former mask 14 (FIGS. 2 and 4). The die assembly is adapted to extrude ceramic substrates each including a matrix of a plurality of cells 16 and a skin 18 that is connected to the cell matrix at the periphery of the substrate (FIG. 6). The cells of the substrates are defined by interconnected porous cell walls or webs 20 of the matrix, and some cells are also defined by skin 18, at least in part, and the walls and skin are formed by extrusion. The ceramic substrate is formed as an extruded column having inlet and outlet ends (only one end being shown in FIG. 6). The cells of a ceramic honeycomb substrate can be any shape, e.g. rectangular or square as shown in the figures. In the interior portion of the ceramic substrate 11, each cell or channel is formed of four web portions 20a, 20b, 20c and 20d that extend along the length of the substrate between its inlet and outlet ends. The die includes an interconnected matrix of slots 22 defined by a plurality of pins 24. During extrusion plasticized batch material is forced through central slots 22a to form the cellular honeycomb matrix, and peripheral slots 22b are covered by the mask 14 (FIG. 2) to form skin layer 18. At the upstream or back end 26 of the die in communication with the extruder are inlet feed holes aligned and communicating with intersecting slots, for example, at alternating intersection points. It should be appreciated that features of the dies shown here are not necessarily to scale or at exact relative dimensions and that for clarity the inlet holes and extruder are not shown. Similarly, dimensions, cell density and shapes of the substrates and die are merely representative and will vary with particular substrates and dies.

Referring to FIG. 2, the skin former mask 14 is a generally annular collar that includes a downstream or front surface 28, an inward facing surface 30 forming a central opening 32 and an upstream or back surface 34. The mask inward facing surface 30 extends parallel to an extrusion direction D in which the slots extend. The back mask surface 34 may have different configurations without affecting the present invention but in this example is shown extending in a radial direction or perpendicular to the inner mask surface 30. The radial direction R is taken radially outwardly from a center of the die perpendicular to the extrusion direction or slot direction D. The mask 14 is spaced from the die 10 in the slot direction D such as by using shims (not shown).

Figure 2:
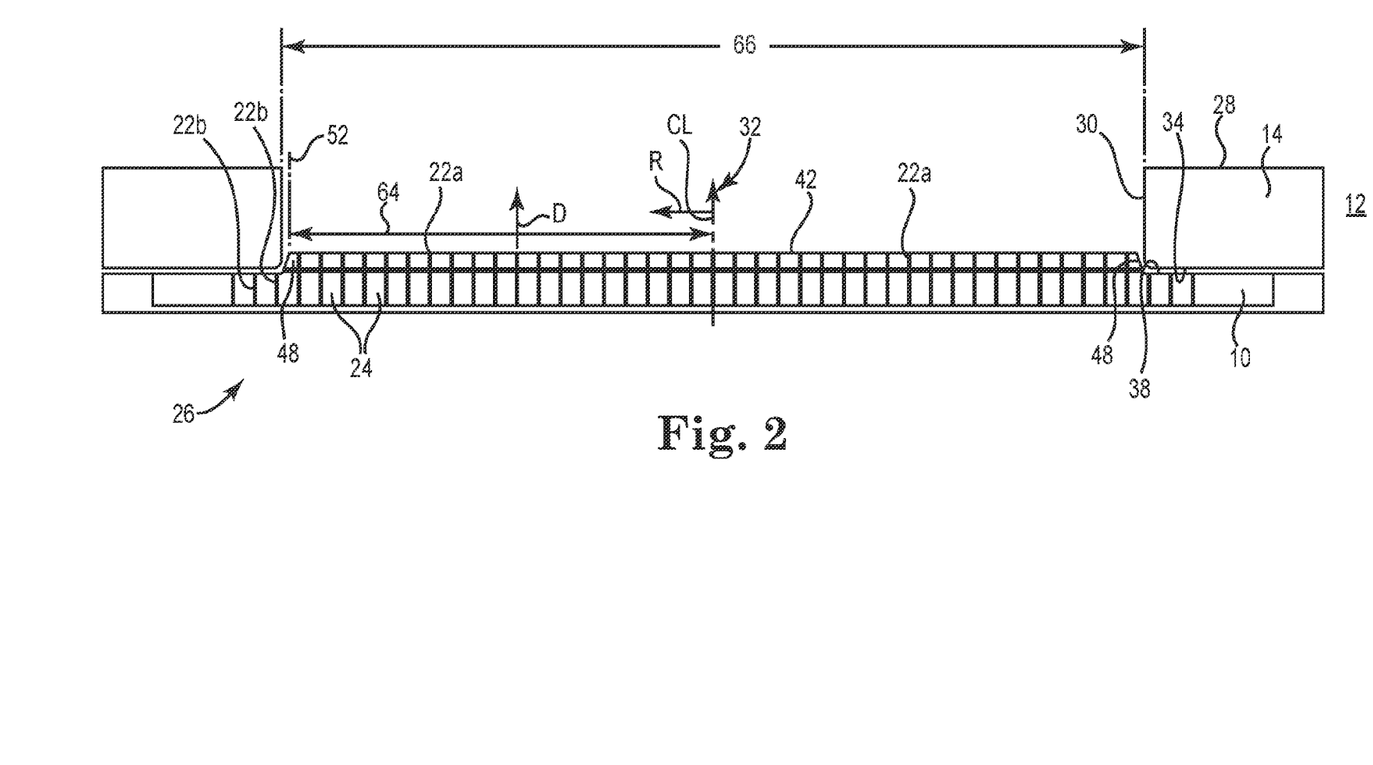
FIG. 2 is a vertical cross-sectional view of a portion of the die of FIG. 1 with the skin former mask.
Figure 3:
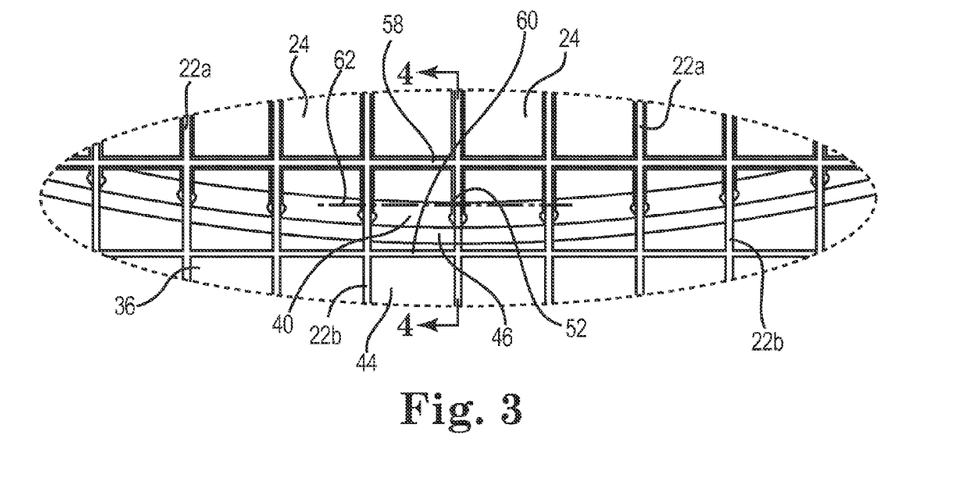
FIG. 3 is a top plan view taken from the dotted lines labeled "FIG. 3" in FIG. 1.
Figure 5:
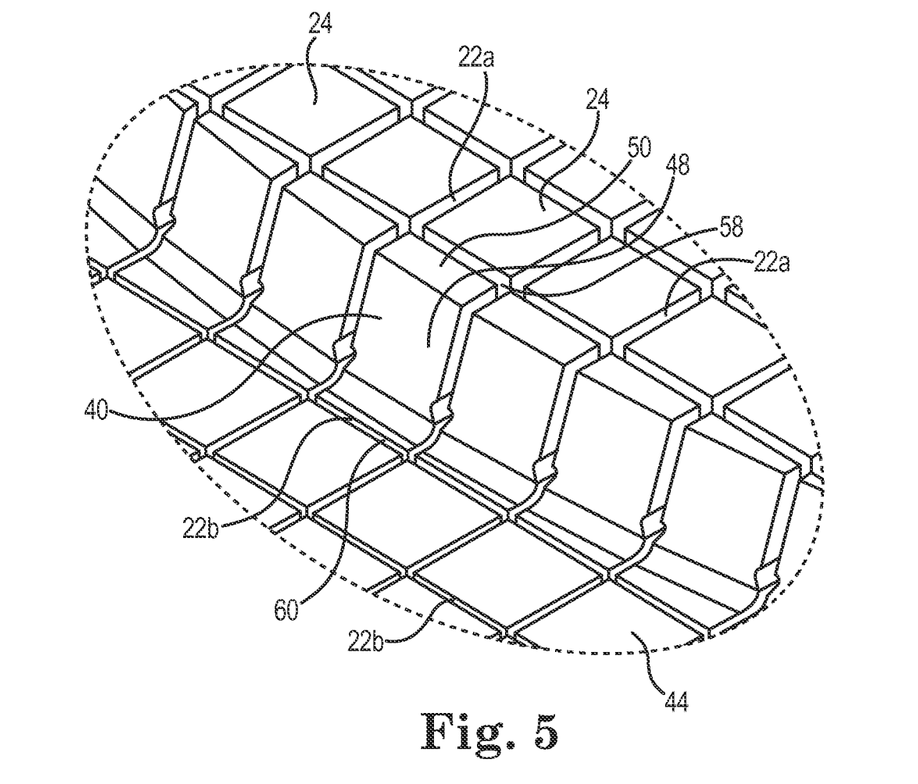
FIG. 5 is a perspective view of the portion of the die shown in FIG. 3.

The slots 22 can be formed by wire cutting an array of holes into a block of rigid material such as stainless steel by an EDM electrochemical machining process. In the case of the square pins shown in FIG. 1, parallel rows X of slots 22 extend in one direction and parallel columns Y of slots 22 extend perpendicular to the row slots (e.g., corresponding to the x and y dimensions of Cartesian coordinates). A skin former surface portion 36 (FIGS. 1-4) is cut into an outer periphery of the downstream end surface of the die including an outer peripheral slotted portion, e.g. by using the EDM electrochemical machining process. The downstream or front face of the die 10 and the skin former mask 14 define a cavity 38 around a perimeter of the die 10 that assists in forming skin which is fed directly by one of the slots 22. Referring to FIGS. 3-5, the skin former portion 36 includes a ramp surface 40 cut into pins 24 and extending at an angle from a discharge face 42 of the die, outwardly and back in an upstream direction relative to flow of batch material from the extruder, to an outer annular peripheral die surface 44. This peripheral die surface 44 can be of various shapes in this example it is annular and flat and perpendicular to the slot direction D. Skin former surface 36 can comprise a radius 46 formed between the peripheral skin former die surface 36 and ramped surface 40.

Figure 1:
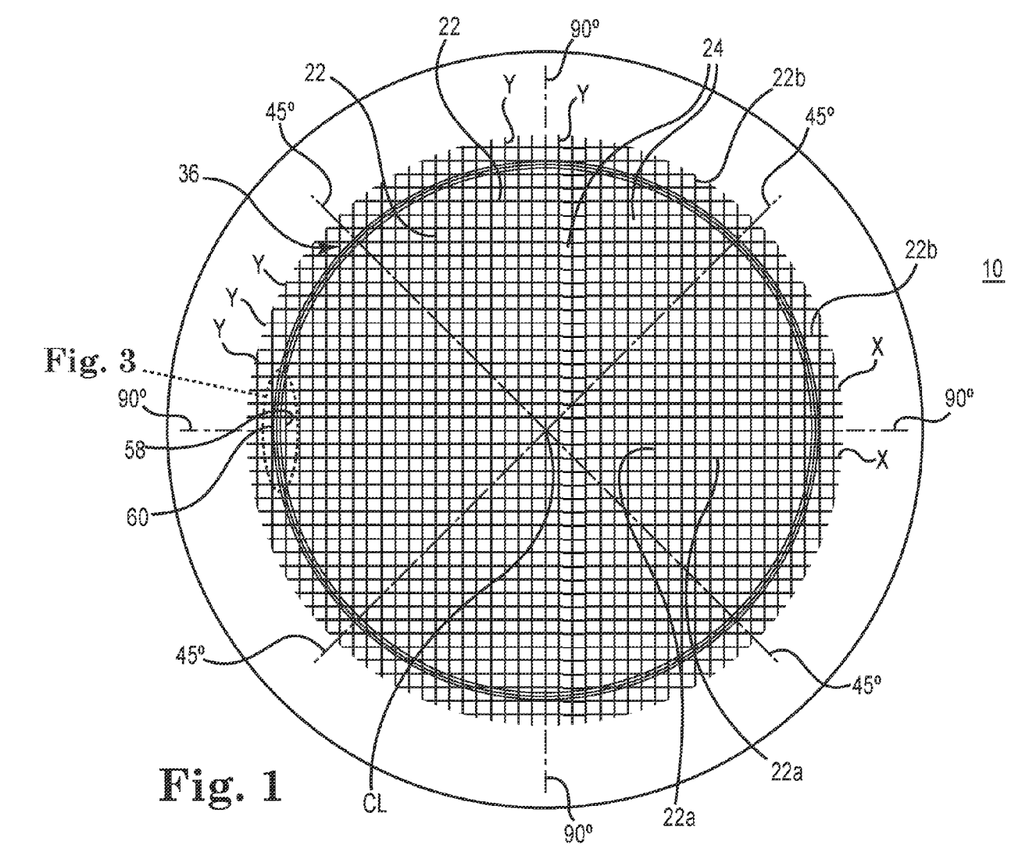
FIG. 1 is a top view of a die constructed in accordance with the present invention without a skin former mask in position.

As shown in FIGS. 1, 3 and 4, the 90 degree positions of the die are disposed at four positions in which nearby inner slots are substantially parallel or substantially perpendicular to a local tangent to the skin former boundary, e.g. skin former ramp 40, while 45 degree positions of the die are disposed at four positions in which nearby inner slots are disposed at about 45° with respect to a local tangent to the skin former boundary for example as seen in FIG. 1 where the 45 degree positions bisect adjacent 90 degree positions (labeled 90°, 45° in FIG. 1). The 90 degree positions of the die and the 45 degree positions of the die are referred to herein as being at the 90's and at the 45's, respectively.

In general, the cutting of the skin former surface 36 into the slotted die block results in the formation of partial pins 48 at the skin former boundary at the 90's (FIGS. 2, 4, 5, 7) at least some of which have a discharge surface 50 on the discharge face of the die and include the ramp or pin face 40. A partial pin is defined herein as anything less than a full pin after cutting in order to form skin former surface 36. The walls of each full pin are formed by the intersection of two adjacent row slots and two adjacent column slots. As disclosed herein, the pin face 40 extends from the discharge surface 50 at a top pin face periphery 52 of the discharge face (FIG. 4). A face gap F is the distance between the mask inner surface 30 and the top pin face periphery 52 on the discharge face of the die. The width of the face gap F determines the initial extruded thickness of the skin layer, although the final skin thickness may be slightly different than the width of that gap due to shrinkage or other factors.

Inner slots are the first slots at the 90's (i.e., the cross-sectional view of FIG. 4) that are disposed inwardly of a partial pin along the pin face, i.e. defined by the partial pin and the next inwardly disposed full pin. Outwardly means further from the center of the die (CL) in the radial direction R while inwardly means closer to the center of the die CL in the opposite direction. If there is more than one partial pin, the inner slot at the 90's is defined as the first slot that is inside the innermost partial pin. Outer slots are the first slots at the 90's that are disposed outwardly of the inner slots. As shown in FIGS. 3 and 4, the inner and outer slots 58, 60, respectively, being at the 90's, are parallel to an imaginary line 62 drawn tangent to the pin face periphery 52 at the 90's. The inner and outer slots and those slots parallel to them are referred to herein as tangent slots. For example, the tangent slots at the 90 degree location depicted in FIG. 3 are column slots Y (see FIG. 1). The row slots X in this region extend transverse to the tangent column slots.

Figure 7:
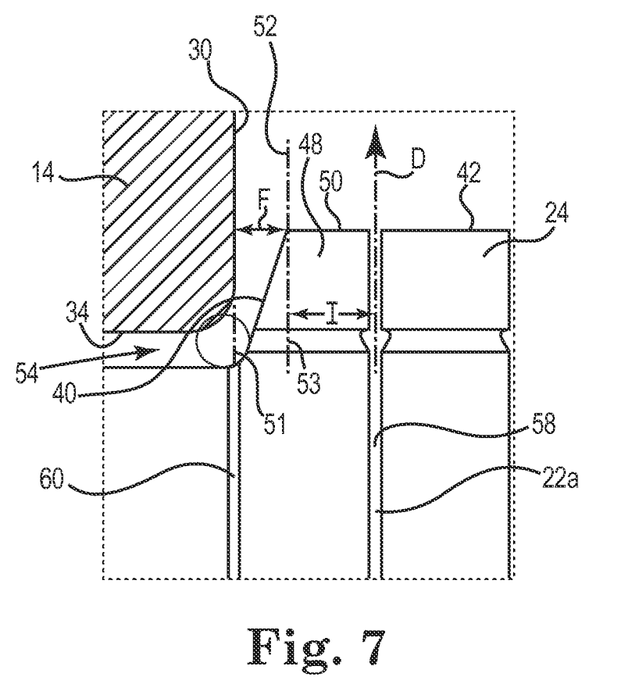
FIG. 7 is a cross-sectional view taken at the 90 degree position of a die (designed for 4.4% shrinkage) that was not constructed according to the invention.
Figure 9:
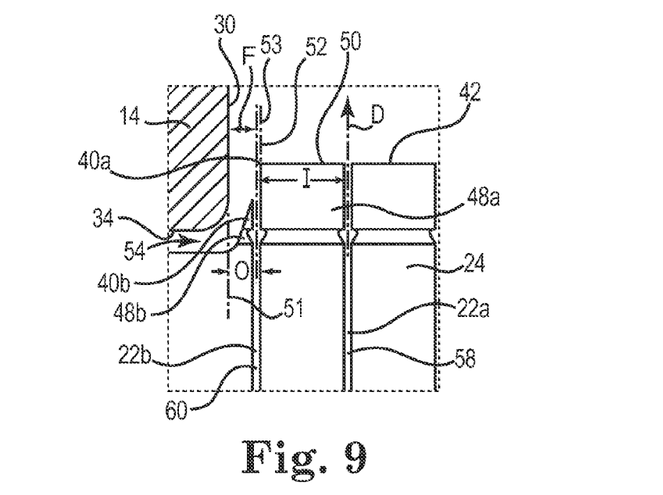
FIG. 9 is a cross-sectional view taken at a 90 degree position of the die (designed for 5% shrinkage) as seen from the plane labeled 9-9 in FIG. 8.

Referring to FIGS. 4, 7 and 9 to illustrate distances relevant to the inventive method, slot width (W) is the distance between the tops of adjacent pins at the discharge face after machining and deposit of wear-resistant metal on the pin walls in a conventional manner. Slot spacing (S) is a distance between centers of adjacent slots. The pin face diameter or pin face distance is the distance along the discharge face between the two points at opposing 90's at the pin face periphery at which the skin former ramp intersects the discharge face (i.e., 2 times the distance 64 shown in FIG. 2). At the pin face periphery 52 the ramp 40 of the innermost partial pin 48, 48a intersects the discharge portion 50 of the die discharge face 42. The die shown in FIG. 9 has two partial pins 48a, 48b and a discontinuous ramp having surfaces 40a, 40b. Mask diameter 66 is the diameter of the central hole of the mask. As already discussed, the face gap (F) is the distance between the mask inner surface 30 and the pin face periphery 52 along the discharge face 42. Outer slot to mask (O) is the distance between the mask inner surface and a center of the outer slot in a direction parallel to the direction R. Inner slot to pin face (I) is the distance between a center of the inner slot 58 and the pin face periphery 52 along the discharge face.

The cut of the skin former portion into the slotted die block ensures that when the mask is positioned so as to form the face gap, skin flow among tangent slots at the 90's is limited to the peripheral batch material 21 fed from peripheral slots 22b (i.e., the outer slots only). This means that no inner or outer slots feed directly into the face gap F when the die is viewed at the 90's (FIG. 4). If an inner or outer slot feeds directly into the skin former portion 36 it is not within a region between an imaginary line 51 extending along mask inner surface 30 and an imaginary line 53 extending along pin face periphery 52, the lines extending in the direction D (FIG. 4). A tangent slot feeding directly into the face gap at the 90's is not considered herein to feed peripheral batch material or to be a peripheral slot.

The peripheral die surface 44 is spaced back (i.e. upstream) from the discharge face 42 so as to receive the mask 14 in the cavity 38. A skin former reservoir 54 is formed between the mask inner and back surfaces 30, 34 and the skin former portion 36 of the die (FIG. 4). Not all of the peripheral slots 22b need be active depending upon the design of the die, including shim position, but batch material 56 from the active tangent, peripheral slots (e.g., including the outer slots) feeds into the skin former reservoir 54 and not directly into the face gap at the 90's.

The dies of FIGS. 4, 7 and 9 were made based on their compatibility with ceramic forming batch material exhibiting 4%, 4.4% and 5% shrinkages (i.e. target shrinkages), respectively that would occur when a ceramic forming material is fired to form the ceramic. These drawings show the skin former portion at the 90's. For example, FIG. 4 was taken along plane 4-4 in FIG. 3 at one of the 90 degree positions of the die. In some embodiments, all of these dies have the same face gap, slot width and slot spacing and are designed to produce substrates having the same fired outer contour, density and web thickness within acceptable tolerances. In the die assembly of FIG. 4 as disclosed herein, none of the tangent slots at the 90's feeds directly into the face gap (i.e., no tangent slot falls in the region between lines 51 and 53). The inner slot 58 only feeds matrix batch material and the outer slot 60 only feeds peripheral batch material 21 into the reservoir behind the mask. The batch from tangent slots that contributes to the skin is thus limited to peripheral batch material, i.e. batch material that has a radical flow component that supplies the face gap F.

The 4.4% shrinkage target die of FIG. 7 does not satisfy the features of the invention in that the outer slot 60 feeds directly into the face gap (i.e., the outer slot 60 is intersected by line 51). Therefore, the skin former portion does not control skin flow at the 90's for the die of FIG. 7 because the batch material from the outer slot feeds directly into the face gap, which results in nonuniform skin thickness at the 90's compared to at the 45's. The die construction of FIG. 9 also is not in accordance with the invention because the outer slot 60 feeds directly into the face gap (i.e., is in the region between lines 51 and 53), contributing to nonuniform skin thickness at the 90's compared to at the 45's. In addition, this design is disadvantageous because the outermost partial pins 40b of the discontinuous skin forming ramp is only a sliver, which is a potentially weak part of that die.

Ceramic batch material under pressure travels from an extruder to the die fastened at the outlet of the extruder. The extruder is any type known to those skilled in the art such as twin screw or ram type of extruder. The batch material enters the inlet holes of the die and travels into both the central and peripheral slots. Most of the batch material travels into the central slots forming the cells of the matrix while other portions of the batch material travel into the active peripheral slots into the skin former reservoir, along the skin former and mask and to the face gap. The batch material extruded from the face gap forms the skin, which is knitted together with the batch material extruded from the outermost central slots. Most of the central slots form full interior cells in the interior of the matrix while the outermost central slots intersect the skin, forming partial cells just inside the inner dimension of the skin.

The extruded green substrate can then processed in a known manner to produce a ceramic honeycomb substrate product, including flow through catalysts and particulate filters (e.g., diesel particulate filters). The green substrate is formed by cutting the batch material extruded from the die at a predetermined length. The green substrate is in the form of a column having, for example, an oval or circular cross-section with a skin having a thickness t between the outer substrate contour S1 to an inner contour S2 (FIG. 6). The inner skin contour is interconnected with the interior cellular honeycomb matrix. The green substrate is fired to produce a ceramic substrate. The substrate may be subjected to some or all of the steps of applying a washcoat and catalyst material along the porous walls of the cellular matrix, plugging, wrapping with a mat, and canning Exhaust gas from internal combustion engines having particulates can be filtered and/or is catalytically reacted while traveling through optionally plugged substrates. The ceramic honeycomb substrates can thus be made to final contour dimensions (i.e., the outer diameter of a fired substrate), cell density and web thickness.

Extrusion dies can be designed to match the shrinkage of the ceramic batch composition from which the substrate will be formed. Small changes in shrinkage can be managed in the manufacturing process to obtain a final exact contour in the fired product. It is thus possible to design dies to match particular shrinkage ranges thereby facilitating greater control of skin uniformity of the honeycomb structure than might be the case at other particular ranges of shrinkage. Thus, greater control may be gained by choosing shrinkages and corresponding die parameters that maintain pin integrity and control slot location at 90 degree positions of the die.

A slotted block of die material (e.g., a die block of FIG. 1 before cutting of the skin former portion), can be provided and a target shrinkage identified and then the arcuate skin former portion can be cut corresponding to the target shrinkage by determining values for slot width (W), slot spacing (S) and face gap (F), and then using values for O and I in ranges for O and I obtained from the following Equations I:

$O$min=a minimum outer slot to mask distance=½$W$;

$I$max=a maximum inner slot to pin face distance=$S$−$F$−$O$min;

$I$min=a minimum inner slot to pin face distance=½$W$; and $O$max=a maximum outer slot to mask distance=$S$−$F$−$I$min.

Equations I help to ensure that partial pins have adequate integrity and that skin flow among tangent slots at the 90's is supplied from peripheral batch material from the outer slots primarily and preferably only from the outer slots. Batch shrinkage can be adjusted to achieve the target shrinkage.

In another aspect of the invention first values for O and I are calculated using a first target shrinkage, outer substrate dimension, mask radius and pin face radius according to Equations II.

Mask Diameter=Fired Contour/(1−% Shrinkage);

Mask Radius=½Mask Diameter;

Pin Face Diameter=Mask Diameter−(2×Face Gap);

Pin Face Radius=½Pin Face Diameter;

Radial Slots=Pin Face Radius/Slot Spacing;

$N$=whole number of radial slots;

Inner Slot=Distance from die center to inner slot=$N$×Slot Spacing;

Outer Slot=Distance from die center to outer slot=($N$+1)×Slot Spacing;

$I$=Inner Slot to Pin Face=Pin Face Radius−Inner Slot; and $O$=Outer Slot to Mask=Outer Slot−Mask Radius.

Preferably, the ratio I:O is between 1.5:1 to 2.5 to 1, more preferably approximately 2:1. Then it is determined whether the first values for O and I satisfy the target ranges for O and I. If the first values for O and I satisfy the ranges and are between 1.5:1 to 2.5 to 1 or approximately 2:1 for O and I, then the die is constructed with the first values of O and I and first target shrinkage. If, as is more likely, the first values for O and I do not satisfy the ranges for O and I or are not approximately 2:1, then a second target shrinkage and corresponding second values for O and I in the range are selected, and the die is constructed using the second values for O and I and second target shrinkage. Batch shrinkage for extrusion through this die can be adjusted to achieve the selected second target shrinkage.

Example 1

The following die features were selected: a face gap of 0.020 inch, a slot spacing of 0.053 inches, outer dimension of the fired substrate of 4.662 inches and a slot width of 0.006 inches. Ceramic-forming batch material having a shrinkage ratio of about 5% could produce a ceramic honeycomb product, such as sold by Corning Incorporated, having a density of 400 cells/in$^2$ and a web thickness of 3 mils, within acceptable tolerances.

First values for O and I can be calculated using Equations II as follows:

Mask diameter=4.662 inches/(1−0.05)=4.907 inches;

Mask radius=2.453 inches;

Pin face diameter=mask diameter−2$F$=4.907 inches−2(0.02 inches)=4.867 inches;

Pin face radius=2.434 inches;

Radial slots=pin face radius/slot spacing=2.434 inches/0.053 inches=45.92

Inner slot=45×slot spacing=2.385 inches;

Outer slot=46×slot spacing=2.438 inches;

$I$=pin face radius−inner slot=2.434 inches−2.385 inches=0.049 inches;

$O$=outer slot−mask radius=2.438 inches−2.453 inches=−0.015 inches.

Acceptable values for O and I can then be obtained for various shrinkages using the values for slot width (W), slot spacing (S) and face gap (F) discussed above. The results are shown in the following Table 1.

TABLE 1

| Shrinkage | PinFaceRadius-InnerSlot | OuterSlot-MaskRadius |
| --- | --- | --- |
| 5.00% | 0.049 | −0.016 |
| 4.75% | 0.042 | −0.009 |
| 4.50% | 0.036 | −0.003 |
| 4.40% | 0.033 | 0.000 |
| 4.30% | 0.031 | 0.002 |
| 4.25% | 0.029 | 0.004 |
| 4.20% | 0.028 | 0.005 |
| 4.15% | 0.027 | 0.006 |
| 4.10% | 0.026 | 0.007 |
| 4.05% | 0.024 | 0.009 |
| 4.00% | 0.023 | 0.010 |
| 3.95% | 0.022 | 0.011 |
| 3.90% | 0.021 | 0.012 |
| 3.85% | 0.019 | 0.014 |
| 3.80% | 0.018 | 0.015 |
| 3.75% | 0.017 | 0.016 |
| 3.70% | 0.016 | 0.017 |
| 3.65% | 0.014 | 0.019 |

Values for I and O and corresponding shrinkages advantageously falling within a target shrinkage window (satisfying Omin, Imax, Imin and Omax) include shrinkage from 3.65% to 4.30% in Table 1. For example, acceptable values for O (0.010 inch) and I (0.023 inch) correspond to a second shrinkage value of 4.00% as founding in Table 1. Other values for I and O and corresponding shrinkages, including those for the first 5% shrinkage die of FIG. 9 and the 4.4% shrinkage die of FIG. 7, fall outside of an acceptable range (i.e., do not satisfy Omin, Imax, Imin and Omax values). The 4.4% shrinkage die of FIG. 7 and the 5% shrinkage die of FIG. 9, which have slots that feed directly into the face gap at the 90's, are identified by Imin, Imax, Omin and Omax as being undesirable.

An extrusion die A was constructed corresponding to the 5% target shrinkage, its O and I values shown in Table 1, and other input parameters discussed above. An extrusion die B was constructed corresponding to the 4% target shrinkage, its corresponding values for O and I of the target shrinkage window shown in Table 1, and other input parameters discussed above.

Figure 8:
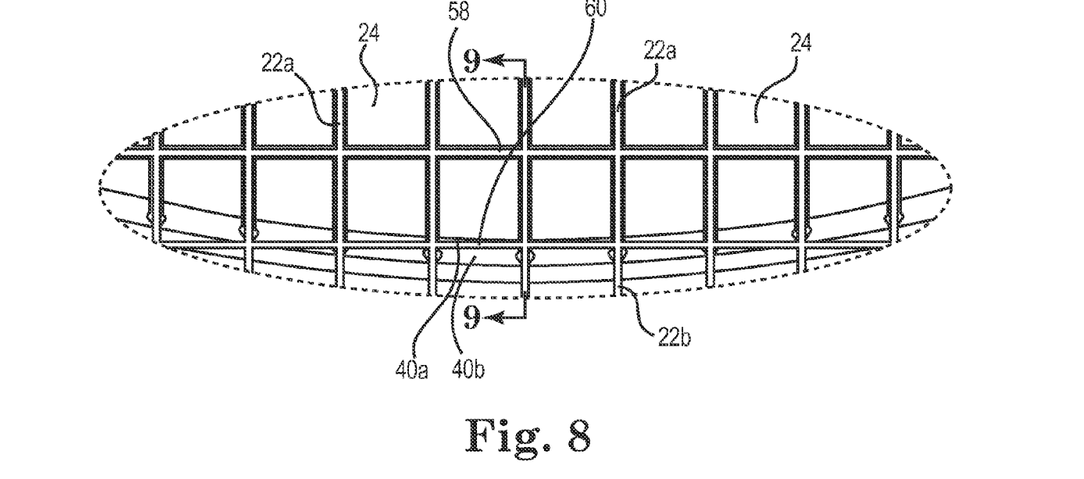
FIG. 8 is a top plan view of a portion of another die that was not constructed in accordance with the invention.
Figure 10:
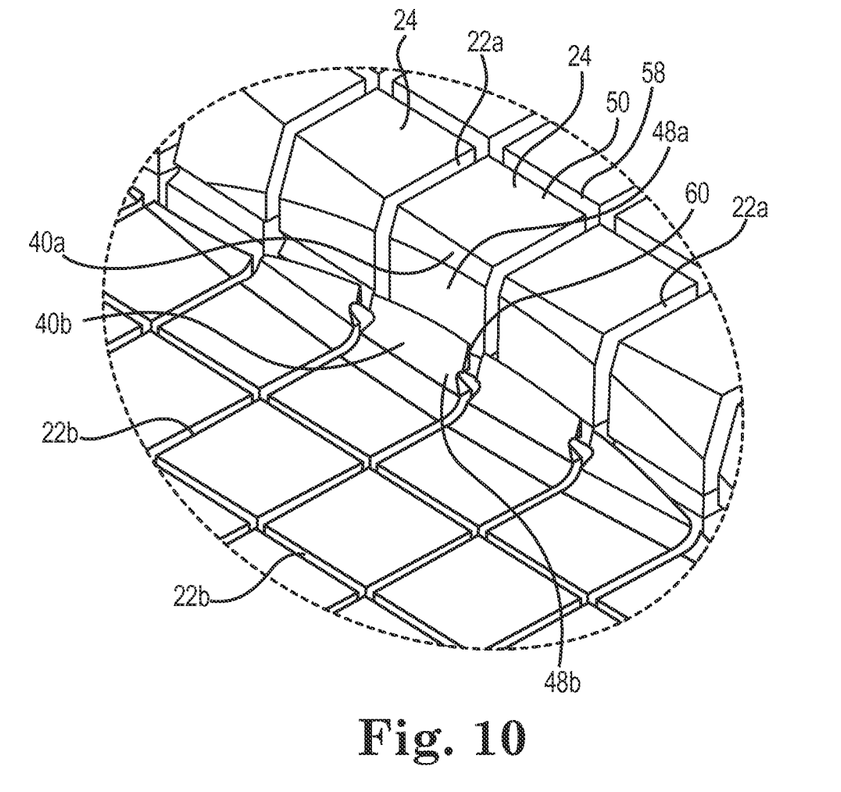
FIG. 10 is a perspective view of the portion of the die shown in FIG. 8.
Figure 11:
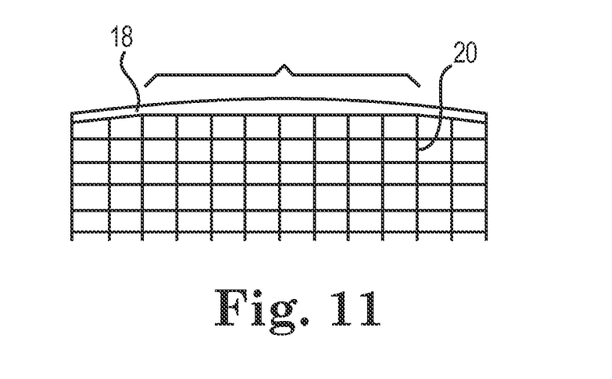
FIG. 11 is a photograph of a 90 degree portion of a fired ceramic substrate produced by the die shown in FIGS. 8-10).

FIGS. 3-5 show extrusion die B and FIG. 6 is a ceramic honeycomb substrate extruded from extrusion die B. FIGS. 8-10 show die A and FIG. 11 is a ceramic honeycomb substrate extruded from die A. The same cordierite-forming batch material was used for the extrusion in both dies except for a batch composition adjustment that produced 4% and 5% shrinkages suitable for the particular die. The cut of the skin former into the slotted die block according to the values of O and I that satisfy the Equations I, results in substrates having outermost cells at and in the vicinity of the 90's (as shown by brackets in FIG. 6) along which the skin has a uniform thickness. However, the Comparative die A having a design in which the outer slot feeds directly into the face gap at the 90's, had O and I values outside the acceptable target range. This resulted in skin of fired substrates that was relatively thick at the 90's compared to at the 45's. This skin around outermost slots at or in the vicinity of the 90's is shown by brackets in FIG. 11. Small partial pins 40b were also formed at the 90's in this Comparative die A design as seen in FIG. 9, which were undesirably weak.

The average skin thickness and Δ skin thickness (the skin thickness at the 90's minus the skin thickness at the 45's) were measured from fired ceramic honeycomb substrates produced using dies A1, A2 and B. The results are shown in the following Table 2.

TABLE 2

| Die | Product Diameter (Inches) | Contour | Avg. Skin Thickness (mils) | 90's (mils) | 45's (mils) | Δ Skin thickness (units) |
|---|---|---|---|---|---|---|
| A1 | 4.662 | 5.00% | 18.70 | 24.19 | 12.59 | 11.60 |
| A1 | 4.662 | 5.00% | 18.49 | 23.06 | 13.92 | 9.14 |
| A2* | 4.662 | 5.00% | 18.00 | 22.48 | 13.53 | 8.94 |
| B | 4.662 | 4.00% | 13.88 | 14.85 | 11.95 | 2.90 |
| B | 4.662 | 4.0% | 14.77 | 14.27 | 15.31 | −1.04 |
| C | 4.662 | 4.25% | 15.80 | 17.30 | 14.40 | 2.90 |

*Dies A1 and A2 were identical. "90's and 45's" were the final skin thicknesses measured at the 90's and 45's in mils. "Skin Δ" was 90's minus 45's.

Referring to the data of Table 2, the extrusion die B constructed using the method disclosed herein at the 4% contour shown in FIGS. 3-5, produced ceramic substrates having much more uniform skin thickness than the Comparative 5% extrusion dies A1, A2 having the contour of FIGS. 8-10. A similar advantage was also observed in a third die that was designed to 4.25% shrinkage which is also included within the desired ranges for O and I. The fired substrates produced by dies B and C exhibited a Skin Δ of not more than 3.00 mils, which was much lower than the Skin Δ for the substrates made from the Comparative dies A1, A2. This uniform skin thickness was achieved for substrates having thin skin, for example, substrates that exhibit an average skin thickness of approximately 15 mils.

Based on this information, for example, rather than commercially producing substrates using the 5% shrinkage die, the 5% shrinkage die of FIGS. 8-10 could be recut to produce the 4% or 4.25% shrinkage die of FIGS. 3-5. The 5% batch shrinkage material could then be adjusted to produce matching batch shrinkage material suitable for use with the dies to produce substrates having enhanced skin uniformity in accordance with the invention.

TABLE 3

| | | Inputs | | | | |
|---|---|---|---|---|---|---|
| CPSI | | 400 | 350 | 600 | 600 | 900 |
| Shrinkage | | 4.00% | 5.00% | 3.45% | 10.40% | 11.00% |
| Fired Diameter | In | 4.662 | 4.662 | 4.662 | 4.662 | 4.662 |
| Web Thickness | Mil | 3.55 | 5.50 | 4.50 | 2.65 | 2.65 |
| Face Gap | In | 0.020 | 0.020 | 0.020 | 0.016 | 0.016 |
| Slot Spacing | In | 0.053 | 0.056 | 0.0425 | 0.045 | 0.0375 |
| Die Front Slot Width | Mil | 3.70 | 5.79 | 4.66 | 2.96 | 2.98 |
| Top of Pin ID | In | 4.81622 | 4.86737 | 4.78859 | 5.17113 | 5.20620 |
| Pin Face Radius | | 2.40811 | 2.43368 | 2.39429 | 2.58556 | 2.60310 |
| Mask ID | In | 4.856 | 4.907 | 4.829 | 5.203 | 5.238 |
| Inner Tang Slot to Pin Face Diam (I) | In | 0.023 | 0.024 | 0.014 | 0.021 | 0.016 |
| Outer Tang Slot from Mask (O) | | 0.010 | 0.012 | 0.008 | 0.008 | 0.006 |
| I:O | | 2.3 | 2.0 | 1.75 | 2.63 | 2.65 |
| Inner Max | | 0.031 | 0.035 | 0.019 | 0.026 | 0.019 |
| Outer Min | | 0.002 | 0.003 | 0.003 | 0.003 | 0.002 |
| Inner Min | | 0.003 | 0.004 | 0.003 | 0.002 | 0.002 |
| Outer Max | | 0.030 | 0.034 | 0.019 | 0.026 | 0.019 |

Example 2

The following input parameters produced acceptable Inner Tang Slot to Pin Face Diameter ("I") and Outer Tang Slot from Mask ("O") values in the following Table 3.

While any of the inputs can be changed to accommodate new product specifications, in commercial production the slot spacing and slot width would be fixed because changing them would require new die fabrication. Face gap could be adjusted in a known manner by using a mask having a different mask diameter.

By way of example, the 5% shrinkage die of Table 3 can be fabricated using the above input parameters for making a product having a 4.662 inch fired outer diameter. If a fired contour of 4.162 inches is required, a changed shrinkage, e.g. 4.3%, can be entered and a smaller pin face diameter would produce acceptable O and I values. One or more other input parameters could also be varied to see whether the acceptable O and I window is obtained. The 5% shrinkage die could be re-cut to a 4.3% shrinkage die having a smaller pin face diameter. This would then require adjusting batch shrinkage to 4.3%.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of forming a die adapted to improve skin uniformity of extruded cellular ceramic substrates, comprising:
   providing a slotted block of die material including central slots adapted to form a cellular matrix of the substrate and peripheral slots located outwardly of the central slots designed to be covered by a skin former mask and adapted to extrude peripheral batch material;
   selecting a target shrinkage;
   cutting an arcuate skin former corresponding to said target shrinkage so as to intersect said slotted block such that skin flow from tangent slots at 90 degree positions of the die is limited to said peripheral batch material; and wherein
   the method includes determining values for a slot width (W), a slot spacing (S) and a face gap (F), and obtaining ranges of O and I as follows:

$O$min=a minimum outer slot to mask distance=½$W$;

$I$max=a maximum inner slot to pin face distance=$S$−$F$−$O$min;

$I$min=a minimum inner slot to pin face distance=½$W$; and $O$max=a maximum outer slot to mask distance=$S$−$F$−$I$min, wherein said skin former is cut at values of O and I in said ranges.

2. The method of claim 1 wherein said cutting of said skin former produces a circular or oval ramp intersecting a discharge face at a front of the die, and a peripheral die surface located outwardly of said ramp.

3. The method of claim 2 wherein said skin former ramp forms a partial pin having a sloped pin face at the 90 degree positions of the die.

4. The method of claim 1 comprising:
   calculating first values for O and I, using a first shrinkage, outer dimension of fired substrate, mask radius and pin face radius; and
   determining whether said first values for O and I satisfy said ranges for O and I.

5. The method of claim 1 wherein the step of cutting the arcuate skin former is configured to provide extrusion of a cellular ceramic substrate with a difference between a skin thickness corresponding to the 90 degree positions of the die and a skin thickness corresponding to 45 degree positions of the die is not more than 3.00 mils.

6. A method of forming a die configured to extrude a honeycomb substrate, the method comprising the steps of:
   cutting a slotted block including an interconnected matrix of slots defined by a plurality of block pins, wherein the matrix of slots include a first set of parallel rows of slots extending in a first direction and a second set of parallel rows of slots extending in a second direction perpendicular to the first direction;
   wherein cutting the slotted block comprises cutting an arcuate skin former into outer peripheral block pins of the plurality of block pins to define outer partial die pins circumscribing central full die pins, wherein the central full die pins each include a discharge surface partially defining a discharge face of the die, the arcuate skin former including a ramp surface extending outwardly at an angle from a pin face periphery of the discharge face of the die, wherein the pin face periphery includes a first pair of 90 degree positions that each include a line tangent to the pin face periphery and extending in the first direction, and the pin face periphery includes a second pair of 90 degree positions that each include a line tangent to the pin face periphery and extending in the second direction, and wherein a first slot of the first set of parallel slots positioned outwardly of each of the first pair of 90 degree positions does not intersect the ramp surface, and a first slot of the second set of parallel slots positioned outwardly of each of the second pair of 90 degree positions does not intersect the ramp surface; and wherein
   the method includes determining values for a slot width (W), a slot spacing (S) and a face gap (F), and obtaining ranges of O and I as follows:

$O$min=a minimum outer slot to mask distance=½$W$;

$I$max=a maximum inner slot to pin face distance=$S$−$F$−$O$min;

$I$min=a minimum inner slot to pin face distance=½$W$; and $O$max=a maximum outer slot to mask distance=$S$−$F$−$I$min, wherein said skin former is cut at values of O and I in said ranges.

7. The method of claim 6, further including the step of selecting a target shrinkage, wherein the step of cutting the slotted block includes cutting the arcuate skin former to correspond to the target shrinkage.

8. The method of claim 6, wherein the ramp surface comprises a circular or oval ramp surface.

9. The method of claim 6, wherein the step of cutting the slotted block provides a peripheral die surface located outwardly of the ramp surface.

10. The method of claim 6, wherein the ramp surface partially defines a plurality of the outer partial die pins.

11. The method of claim 6 comprising:
  calculating first values for O and I, using a first shrinkage, outer dimension of fired substrate, mask radius and pin face radius; and
  determining whether said first values for O and I satisfy said ranges for O and I.

12. The method of claim 6, wherein the step of cutting the arcuate skin former is configured to provide extrusion of a cellular ceramic substrate with a difference between a skin thickness corresponding to the 90 degree positions of the die and a skin thickness corresponding to 45 degree positions of the die is not more than 3.00 mils.

13. A method of forming a die configured to extrude a honeycomb substrate, the method comprising the steps of:
  cutting a slotted block including an interconnected matrix of slots defined by a plurality of block pins, wherein the matrix of slots include a first set of parallel rows of slots extending in a first direction and a second set of parallel rows of slots extending in a second direction perpendicular to the first direction;
  wherein cutting the slotted block comprises cutting an arcuate skin former into outer peripheral block pins of the plurality of block pins to define outer partial die pins circumscribing central full die pins, wherein the central full die pins each include a discharge surface partially defining a discharge face of the die, the arcuate skin former including a ramp surface extending outwardly at an angle from a pin face periphery of the discharge face of the die, and the arcuate skin former further including an outer peripheral die surface extending outwardly from the ramp surface and circumscribing the ramp surface, and wherein the pin face periphery includes a first pair of 90 degree positions that each include a line tangent to the pin face periphery and extending in the first direction, and the pin face periphery includes a second pair of 90 degree positions that each include a line tangent to the pin face periphery and extending in the second direction, and wherein a first slot of the first set of parallel slots positioned outwardly of each of the first pair of 90 degree positions is offset outwardly from the ramp surface and intersects the outer peripheral die surface, and a first slot of the second set of parallel slots positioned outwardly of each of the second pair of 90 degree positions is offset outwardly from the ramp surface and intersects the outer peripheral die surface; and
  wherein
  the method includes determining values for a slot width (W), a slot spacing (S) and a face gap (F), and obtaining ranges of O and I as follows:

$$O\text{min} = \text{a minimum outer slot to mask distance} = \tfrac{1}{2}W;$$

$$I\text{max} = \text{a maximum inner slot to pin face distance} = S - F - O\text{min};$$

$$I\text{min} = \text{a minimum inner slot to pin face distance} = \tfrac{1}{2}W; \text{ and}$$

$$O\text{max} = \text{a maximum outer slot to mask distance} = S - F - I\text{min},$$

wherein said skin former is cut at values of O and I in said ranges.

14. The method of claim 13, further including the step of selecting a target shrinkage, wherein the step of cutting the slotted block includes cutting the arcuate skin former to correspond to the target shrinkage.

15. The method of claim 13, wherein the ramp surface comprises a circular or oval ramp surface.

16. The method of claim 13, wherein the ramp surface partially defines a plurality of the outer partial die pins.

17. The method of claim 13 comprising:
  calculating first values for O and I, using a first shrinkage, outer dimension of fired substrate, mask radius and pin face radius; and
  determining whether said first values for O and I satisfy said ranges for O and I.

18. The method of claim 13, wherein the step of cutting the arcuate skin former is configured to provide extrusion of a cellular ceramic substrate with a difference between a skin thickness corresponding to the 90 degree positions of the die and a skin thickness corresponding to 45 degree positions of the die is not more than 3.00 mils.

* * * * *